Jan. 21, 1969  A. L. HUBBARD  3,422,608
COTTON HARVESTER
Filed Oct. 21, 1965
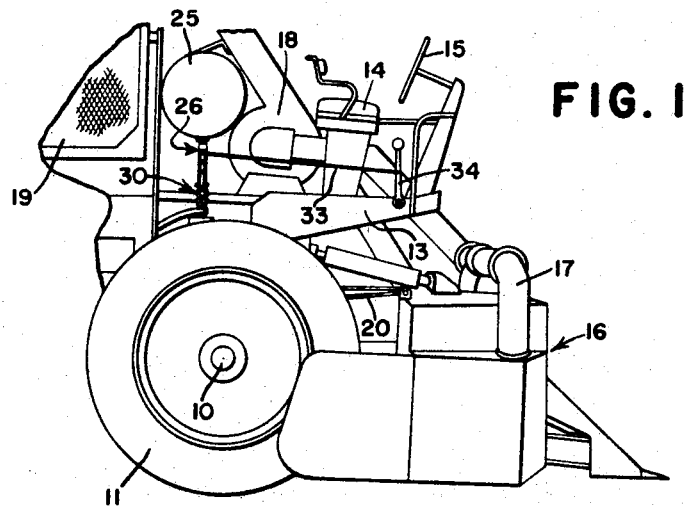
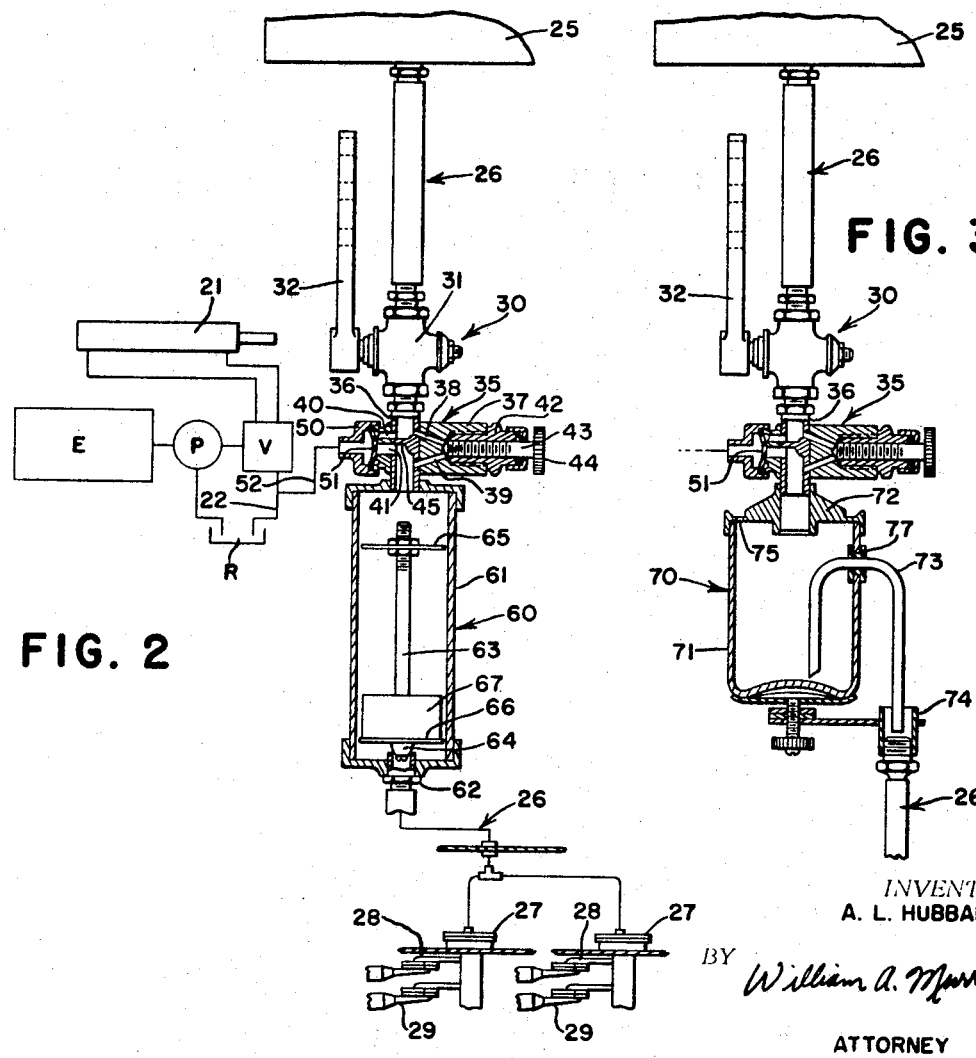
INVENTOR.
A. L. HUBBARD
BY William A. Murray
ATTORNEY

United States Patent Office 3,422,608
Patented Jan. 21, 1969

3,422,608
COTTON HARVESTER
Arthur L. Hubbard, Des Moines, Iowa, assignor to Deere
 & Company, Moline, Ill., a corporation of Delaware
Filed Oct. 21, 1965, Ser. No. 499,276
U.S. Cl. 56—41                7 Claims
Int. Cl. A01d 45/18; F04f 10/02

This invention relates to a cotton harvester and more particularly to the moistener mechanism that moistens and cleans the picking spindles in a cotton harvester. Still more particularly this invention relates to a metering and flushing valve in the moistening mechanism that controls the amount of fluid passing onto the picking spindles.

In the conventional type of cotton harvester there is provided an upright harvesting drum with laterally extending picking spindles that move into and out of the cotton plants for the purpose of harvesting the cotton bolls from the plants. In harvesting the plants, the picking spindles will also have an accumulation of dirt and plant juices remain on the spindle surfaces that, upon accumulation thereof, will reduce the efficient picking of the bolls from the plants. There are consequently provided moistener mechanisms that wet and clean the spindles.

There are normally as many as twelve to sixteen horizontal rows of picking spindles. Consequently there are required at least a similar number of moistener mechanisms for each harvesting drum. On a two-row cotton harvester there are four of such drums and consequently there would be required as many as sixty-four moisteners having moistening pads to accommodate cleaning of the spindles of these drums. For this reason there is normally required a rather complicated metering system that meters out a small amount of cleaning fluid or water, in some instances, to the moistener pads and from thence onto the spindle surfaces. Such a metering system is shown, by way of example, in U.S. Patent 3,137,113 which issued to the present inventor on June 16, 1964. Since each individual conduit to the moistener pads must be required to carry only a small amount of fluid, the conduits may in some instances become clogged. Also, since only a small amount of fluid is required to be passed onto the spindles, fluid moving through the conduits will take the path of least resistance and should one or several of the individual conduits to the moistener pads become clogged, the fluids will move to the units that are not clogged. Consequently there is created a condition in present day moistening arrangements which requires a certain amount of maintenance in order to maintain all of the units unclogged and to permit ready passage of fluid to all the moistener pads.

With the above in mind, it is the primary object of the present invention to provide a fluid metering system that is not continuous but is intermittent. It is desirable and it is the object of the present invention to provide structure that permits the fluid to move onto the picking spindles in somewhat greater quantity at intervals as the harvester moves over the field.

It is a further object of the invention to provide with the above type metering system a bypass valve arrangement that operates through the lifting or raising of the harvesting units at the end of the rows to cause the cleaning fluid to flush through the metering system and onto the picking spindles while they are not harvesting cotton.

Other objects and advantages of the present invention will become apparent to those skilled in the art as the nature of the invention is better understood from the following description and as shown in the accompanying drawings.

FIG. 1 is a side perspective view of the front portion of a cotton harvester.

FIG. 2 is a vertical sectional view through the metering valve assembly of the moistening system shown in FIG. 1 with portions of the harvester shown in representative form.

FIG. 3 is a vertical sectional view of a metering valve system and showing a modified form of the invention.

The cotton harvester may be of the type shown and described in U.S. Patent 2,719,394 which issued to F. A. Thomann and R. H. Meier. Similarly the basic moistener arrangement may be of the type shown in U.S. Patent 2,795,096 which issued to R. H. Meier. Since details of the cotton harvester and moistener are shown and described in these patents, details of such will not be repeated in the present application. Therefore, the description of the harvester as well as the moistener mechanism will be only general and in such detail as is necessary to understand the present invention.

The cotton harvester includes a transverse axle structure 10 supported on transversely spaced apart traction wheels 11. The harvester has a laterally disposed platform 13 having an operator's seat 14 facing forwardly to a steering wheel 15. Supported forwardly of the axle structure 10 and wheels 11 is harvester mechanism, indicated in its entirety by the reference numeral 16, that has suitable discharge conduits 17 extending upwardly and rearwardly to a blower 18. The blower operates to receive cotton from the harvester 16 and to discharge it into a container or basket indicated only partially at 19. The harvester 16 is raised and lowered by lift arms, one of which is shown at 20. The lift arms 20 are rocked on a suitable support, not shown, and are raised and lowered by means of a hydraulic cylinder, shown in representative form at 21 in FIG. 2.

The hydraulic system for operating the cylinder 21 and to thereby raise and lower the harvester 16 is shown in representative form in FIG. 2. Basically it includes an engine E, which may be the main power source for the harvester, and a hydraulic pump P driven by the engine E. The pump receives fluid from a reservoir R and feeds it through a valve V that is adjustable to feed fluid to and from opposite ends of the hydraulic cylinder 21 or return it through a suitable line 22 to the reservoir R. Such a hydraulic system is shown in more detail in U.S. Patent 3,002,462 that issued to T. E. Raymond.

Supported on the harvester is a tank 25 that has conduit means, indicated in its entirety by the reference numeral 26, extending from the tank 25 to moistener columns 27 contained within the harvester 16. As is conventional, the moistener columns 27 include a series of laterally extending arms 28 having moistener pads that extend above and engage the upper side of harvesting spindles 29. The harvesting spindles 29 are part of the conventional type harvesting drums normally used in cotton harvesters.

Contained in the fluid conduit 26 is a valve mechanism 30 that includes a main shutoff valve 31 with a vertical lever 32 and having a fore-and-aft extending rod 33. A control lever 34 is positioned adjacent the operator's seat 14 and is connected to the forward end of the rod 33. The lever 34 may be adjusted to open and close the main valve 31.

Beneath the main valve 30 is an adjustable valve device 35 that includes a central conduit or pipe 36 having a valve core 37 fixed thereto. The valve core 37 has upper and lower fluid passageways 38, 39 extending to one side of the conduit 36 and upper and lower fluid passages 40, 41 extending to the opposite side. The passages 38–41 are in communication with the center of the pipe 36. A horizontal or axially extending tapped opening is provided in the core 37 that receives a nut 42. The center of the nut 42 is threaded to receive a valve stem 43 with an inner end that moves adjacent to the ends of the passages 38, 39. The stem 43 is provided with a manual knob 44 so that the stem may move toward and away from the passages 38, 39 to provide an adjustable means permitting fluid to flow through the passages 38, 39 and into the central opening of the main pipe or conduit 36.

As may be seen from viewing FIGS. 2 and 3, fluid is normally blocked from passing through the pipe 36 by a metal piece 45 and consequently fluid, in order to move through the pipe 36, must move through passages 38, 39 or passages 40, 41. A cap or fitting 50 is provided on the valve block 37 adjacent the passages 40, 41. Contained within the cap 50 is a diaphragm 51 that bears against the end of the metal block 45 and the end of the valve block 37. Consequently in normal operation the passages 40, 41 are blocked against communication with one another. Extending from the fitting 50 is a hydraulic line 52 that is connected to the return line 22 of the hydraulic system.

In operation, the engine E will normally drive the pump P so that there is pressure supplied in the line 22. The pressure in the line 22 also extends through the line 52 so that fluid compresses the diaphragm 51 against the end of the valve block 37 to thereby close the connection between the passages 40, 41. However, upon the harvester reaching the end of a row, the valve V is adjusted so that pressure extends through the lines going to and from the hydraulic cylinder 21. This causes the pressure in the line 22 to fall which also causes the pressure in the line 52 to fall and the diaphragm 51 to open to thereby permit communication between the passages 40, 41. This, of course, will permit the fluid to move freely through the pipe 36 and into the remainder of the conduit means.

On the opposite side of the valve device 35, the knob 44 is adjusted to permit a desired amount of fluid to move through the passages 38, 39. Normally this will be a little more than a trickle. However, the adjustable valve 43 will normally remain open throughout operation of the harvester. In fact, therefore, the diaphragm valve 51 operates as a flushing valve at the end of the rows and does in fact operate as a bypass to the adjustable valve 43.

Positioned directly beneath the valve device 35 and connected to the pipe section 36 is a liquid or fluid accumulator, indicated in its entirety by the reference numeral 60. The accumulator includes an upright circular tank 61 having a central fluid fitting 62 at its base. Contained within the tank 60 is an upright float-type valve structure that includes a central stem 63 having a rubber valve 64 at its lower end that closes the upper opening of the outlet 62. Upper and lower horizontal plates 65, 66 are secured to the upper and lower ends of the stem 63. Positioned between the plates 65, 66 is a float 67 capable of moving vertically on the stem 63 in accordance with the level of the water or liquid within the tank 60.

Reviewing operation of the structure as described so far, in normal operation the diaphragm 51 is closed and consequently the only fluid floating into the accumulator tank 60 is that which moves through the passages 38, 39. Normally the valve 43 will be closed sufficiently that only a trickle of fluid or water moves into the tank 60. As it accumulates in the tank 60 the float 67 moves upwardly until eventually it contacts the underside of the plate 65 to thereby raise the valve 64 away from the opening. At this point all the fluid accumulated in the tank 60 will be discharged into the remaining part of the conduit means 26. Consequently as the harvester moves over the field, fluid will move through the conduit means 26 and onto the moistener pads 28 intermittently. The length of time between the intermittent flow of fluid may be determined by adjusting the knob 44. At the end of the row when the harvester units 16 are raised, the valve 51 will open and consequently the liquid in the tank 25 will bypass the adjustable valve 43 and move into the tank 60 at such a rate as to avoid the intermittent relation of the flow of fluid into the moistener columns 27. This will, of course, create a hard flush of the spindles 29 at the end of the rows or at the time they are not harvesting cotton.

In the form of the invention shown in FIG. 3, the main valve structure 30 and the adjustable valve device 35 are identical to that of the previous form. A different form of accumulator is, however, provided. An accumulator 70 includes an accumulator tank 71 that has an upper fitting 72 connected to and adapted to receive fluid or liquid through the conduit or pipe 36. The tank 71 has a side opening, as indicated by a gasket 77, in the upper portion of one of its sides. A U-shaped tube or pipe 73 is inserted through the gasket 77 and has a vertical leg portion terminating at the base of the tank 71. An opposite leg portion on the outside of the tank 71 extends into a fitting 74 which in turn is connected to part of the conduit means 26 leading to the respective moistener columns 27. A small air opening 75 is provided in the upper fitting 73.

In the form of the invention shown in FIG. 3, liquid or fluid is normally permitted to trickle through the valve device 35 and to slowly fill the tank 71. Upon the fluid reaching the height of the horizontal portion of the U-shaped pipe or tube 73, fluid will begin to flow through the pipe 73 through a suction or siphon action. Once the flow has begun, the entire tank will be emptied until the liquid or fluid passes beneath the level of the lower end of the tube 73. At this time the fluid will again begin to build up to the level of the horizontal portion of the tube 73 where it will again be siphoned off. Consequently an intermittent flow of fluid from the accumulator tank 71 is created.

While only the preferred forms of the invention have been shown, it should be recognized that other forms and variations will occur to those skilled in the art. Therefore while the preferred forms were shown for the purpose of clearly and concisely illustrating the principles of the invention, it should be understood that there is no intention to limit or narrow the invention beyond the broad concept set forth in the appended claims.

What is claimed is:

1. A moistener flow device for a cotton harvester disposed between a fluid container and a moistener column having means thereon adapted to contact and moisten spindles of a cotton harvesting mechanism, said flow device comprising: conduit means extending between the fluid container and moistener column; a fluid accumulator tank in the conduit means; adjustable valve means between the container and accumulator tank for regulating the rate of a continuous flow of fluid into the accumulator tank; and fluid releasing means associated with the accumulator tank, the fluid releasing means being adapted to intermittently release a predetermined quantity of fluid from the tank into the conduit means for deposit in the moistener column upon the predetermined quantity of fluid being accumulated in the accumulator tank whereby fluid may pass into the moistener column intermittently and in said predetermined quantities.

2. The invention defined in claim 1 further characterized by a valve bypass in the conduit means adapted to bypass fluid around the adjustable valve means and into the accumulator tank and in quantities greater than the amount passing through the adjustable valve means to provide continuous flow of fluid from the accumulator tank into the moistener column.

3. The invention defined in claim 1 in which the accumulator tank has a base outlet therein, and the fluid releasing means includes a float-type valve adapted to release the fluid through the base outlet upon the fluid reaching a predetermined height.

4. The invention defined in claim 1 in which the cotton harvester has a hydraulic system utilized to raise and lower the harvester and a control valve for effecting adjustment of the hydraulic system and further characterized by bypass means in the conduit means for effecting continuous flow from the container to the moistener column and being connected to the hydraulic system whereby operation of the bypass means is incident to vertical movement of the harvester.

5. A moistener flow device for an implement disposed between a fluid container and a fluid dispenser comprising: conduit means extending between the fluid container and moistener dispenser; a fluid accumulator in the conduit means; valve means in the conduit means between the container and accumulator for regulating the rate of a continuous and relatively slow flow of fluid into the accumulator; and fluid releasing means associated with the accumulator adapted to release a predetermined quantity of fluid into the fluid dispenser in response to the level of fluid reaching a predetermined level in the accumulator whereby fluid may pass into the fluid dispenser intermittently and in predetermined quantities.

6. The invention defined in claim 1 in which the cotton harvester has a power source and a hydraulic system driven by the power source including a control valve, the hydraulic system being utilized for positioning the harvester, and further characterized by bypass means in the conduit means for effecting movement of fluid from the container to the moistener column in a substantially continuous flow, the bypass means being connected to the hydraulic system and responsive to valve adjustment of the control valve to cause the fluid to bypass the adjustable valve means.

7. A moistener flow system for a cotton harvester disposed between a fluid container and a moistener column, the latter having means thereon adapted to moisten spindles of a cotton harvesting mechanism, and in which the harvesting mechanism is adapted for vertical adjustment on a harvester frame between upper and lower positions, the moistener system comprising: conduit means extending between the container and column; a vertical accumulator tank in the conduit means; an adjustable valve in the conduit means between the tank and container for regulating a continuous flow of fluid into the tank; fluid releasing means associated with the tank responsive upon the fluid reaching a predetermined upper level to dispense a fixed quantity of fluid to the moistener column from the tank and to thereby reduce the quantity of fluid to a lower level, said fluid releasing means being responsive to the fluid reaching the lower level to stop release of fluid into the moistener column; and a bypass valve means in said conduit means between the container and column operatively connected to the harvesting mechanism to open and flush said spindles in response to the raising of the harvesting mechanism to its upper position.

References Cited

UNITED STATES PATENTS

| | | | |
|---|---|---|---|
| 2,525,184 | 10/1950 | Rust | 56—41 |
| 2,650,462 | 9/1953 | Skaggs | 56—41 X |
| 2,711,066 | 6/1955 | Barbknecht | 56—41 |
| 2,787,880 | 4/1957 | Fergason | 56—41 |
| 3,047,997 | 8/1962 | Hubbard | 56—44 |
| 3,066,466 | 12/1962 | Hubbard | 56—41 |
| 3,066,467 | 12/1962 | Barfield | 56—44 |
| 3,137,113 | 6/1964 | Hubbard | 56—41 |

ROBERT E. BAGWILL, *Primary Examiner.*

U.S. Cl. X.R.

137—132